July 6, 1965   D. W. HAMM   3,193,285
PISTON RING
Filed April 20, 1964   3 Sheets-Sheet 1

INVENTOR.
DOUGLAS W. HAMM
BY
*Price & Heneveld*
ATTORNEYS

July 6, 1965  D. W. HAMM  3,193,285
PISTON RING

Filed April 20, 1964  3 Sheets-Sheet 2

INVENTOR.
DOUGLAS W. HAMM
BY
ATTORNEYS

July 6, 1965     D. W. HAMM     3,193,285
PISTON RING

Filed April 20, 1964     3 Sheets-Sheet 3

INVENTOR
DOUGLAS W. HAMM
BY *Price & Heneveld*
ATTORNEYS

United States Patent Office 3,193,285
Patented July 6, 1965

3,193,285
PISTON RING
Douglas W. Hamm, Muskegon, Mich., assignor to Muskegon Piston Ring Company, Muskegon, Mich., a corporation of Michigan
Filed Apr. 20, 1964, Ser. No. 361,026
9 Claims. (Cl. 277—215)

This invention relates to the manufacture of piston rings fabricated from thin sheet or ribbonlike material having one circumferential edge divided into a number of segments or sections each of which is a segment of a true, continuous curve.

This invention is an improvement over the teachings of United States Patent No. 1,668,131 entitled Method of Making Piston Rings, issued February 2, 1954. It is also a continuation-in-part of my co-pending application Serial No. 212,208 filed July 25, 1962, entitled Method of Making Rings.

The method taught in the issued patent is satisfactory in many cases. However, it has been discovered that in a significant percentage of the rings fabricated by this method, deformation of the edge of the material occurs at the score lines. This results in the ends of each of the segments being turned inwardly so that each segment fails to trace a perfect curve at each of its ends. This is particularly troublesome in the case of piston rings, because the resulting product does not have the expected sealing qualities. A small gap is created between the cylinder wall and the ring at the end of each of the score lines. While these gaps were small, collectively they created a sufficient passage for lubricants and gases to materially reduce the sealing effectiveness of the ring.

This invention solves this problem and the rings produced by this invention do not have this indentation or gapping. Thus, they have substantially improved sealing qualities. Rings manufactured using this invention have segments each of which is a true segment of the circle defined by the ring. Thus, this invention makes a significant contribution to the control of blowby and oil economy.

It has also been discovered that the flatness of the segments can be improved if the blank is scored on both faces. The stresses incident to the rupturing operation tend to be concentrated at the center of the material, i.e. between the score lines, by the addition of the second score line. This spaces the stresses and their tendency to distort the material from both faces. The result is reduced tendency of the material to draw or neck down because the surface material is relieved of the loads which tend to produce this result.

Experimentation has shown that the second score line may be made smaller and shallower than the primary one, the primary one being used to locate and initiate the rupture.

It has also been discovered that in rings fabricated by this method in which it is desirable to have segments of greater length that the score lines should be provided at the end of every slot even though only selected ones of them are ruptured. Unless this is done the portions of the edge at the ends of the slots where no score line is provided have greater strength than those portions where the score lines are provided. When the rings are coiled prior to rupturing, the areas of greater strength tend to distort slightly producing a ring which is not entirely circular. By scoring at each slot, uniformity of structure is maintained throughout the circumference of the ring. The result is a ring of more perfect circular configuration.

These and other objects and purposes of this invention will be understood by those acquainted with the design and manufacture of piston rings upon reading the following specification and the accompanying drawings.

In executing this invention a strip of heat treatable material is provided with laterally extending slots arranged at a predetermined spacing along the strip. Score lines are impressed into it at the ends of each of the slots. These score lines may be terminated a short distance from the edge of the strip which is to form a circumferential margin of the finished product. The strip is then coiled and heat treated to a brittle hardness and all or selected ones of the score lines are ruptured, one by one, by subjecting the area of the score line to circumferential tension in excess of the ultimate tensile strength of the material. The strip is again heat treated to a hardness suitable for its ultimate use.

Referring specifically to the drawings and to the embodiments illustrated in FIGS. 1 through 8, which are particularly suited to blanks of relatively thick material such as 0.020 of an inch or more, the numeral 10 refers to a strip of material which has been die cut to form a blank. The blank has a plurality of longitudinally spaced apertures 11 and 12. Each has a rounded end and a pointed or wedge-shaped end, with ends of similar shape of adjacent apertures arranged on opposite sides of the blank. From each of the pointed ends an indentation or score line 13 extends toward the adjacent edge of the strip but terminates a short distance inwardly of the edge. The spacing between the terminus of the score line 13 and the adjacent edge may vary from one application to another but experience has shown that it is most satisfactory when it is in the range of 0.005 to 0.060 of an inch. A preferred distance is 0.03 of an inch.

Figure 7:
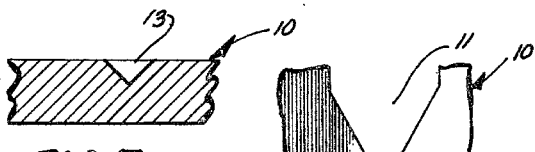
FIG. 7 is an enlarged fragmentary sectional view taken along the plane VII—VII of FIG. 6.

The score lines 13 may be formed simultaneously with the blanking out of the apertures 11 and 12 or they may be formed in a separate operation. In either case they are formed by pressing a male die into the metal to form a shallow channel by compressive displacement of the metal. Particularly in the manufacture of piston rings and expander-spacers for piston rings, it is important that the blank 10 be positively supported beneath the dies as the score lines are formed, to prevent the metal from being displaced through the blank to form a ridge on the face opposite the score line. FIG. 7 shows that no such ridge is formed.

Figure 6:
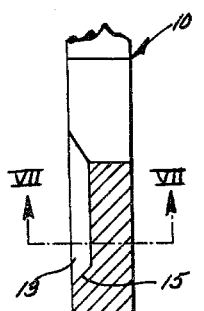
FIG. 6 is an enlarged fragmentary sectional view taken along the plane VI—VI of FIG. 5.
Figure 5:
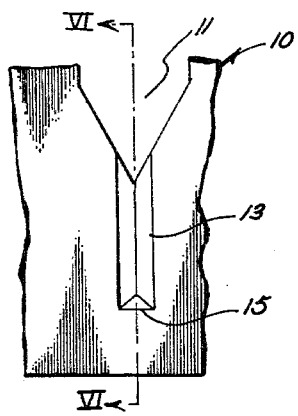
FIG. 5 is a fragmentary enlarged plan view of one edge of the blank shown in FIG. 1.

In cross section, the score lines 13 have downwardly converging sides forming a sharp V or apex at the bottom (FIGS. 5, 6 and 7). This provides a line along which stresses will concentrate when tension is applied to the area to effect a rupture of the material. The score lines have a depth between a quarter and a half of the thickness of the material. A depth of approximately a third of the thickness is quite satisfactory.

Figure 8:
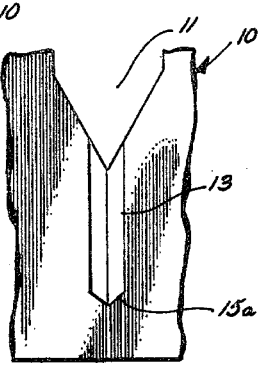
FIG. 8 is an enlarged fragmentary plan view of a ring incorporating a modified form of this invention.

The score lines may have a blunt terminus 15 as suggested in FIG. 5 or a pointed terminus 15a as suggested in FIG. 8. The latter has the advantage of positively locating the starting point of the rupture as it extends outwardly from the end of the score line.

Figure 9:
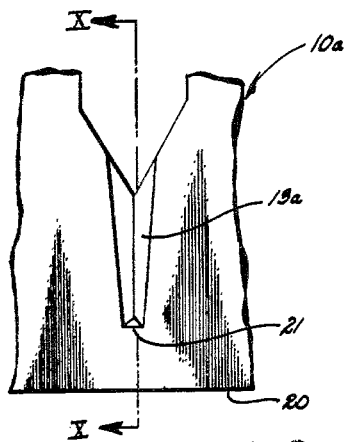
FIG. 9 is an enlarged fragmentary plan view of a still further modified form of this invention.
Figure 10:
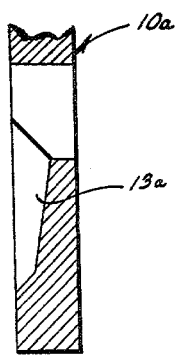
FIG. 10 is an enlarged fragmentary sectional view taken along the plane X—X of FIG. 9.

The score line may taper both in width and depth. This is suggested in FIGS. 9 and 10 wherein the score line 13a narrows and is of progressively lesser depth as it extends outwardly toward the edge 20 of the blank 10a. Again, the terminus 21 may be either blunt or pointed.

Figure 2:
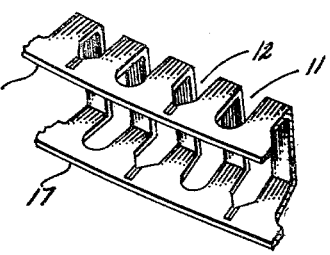
FIG. 2 is a fragmentary oblique view of the blank of FIG. 1 after it has been coiled but before the individual segments have been separated one from another.

To form a ring of the type illustrated in FIG. 2, the blank 10 is bent along two parallel bend lines extending lengthwise of the blank. This gives the ring its basic U-shaped cross-sectional configuration. It will be recognized that the U-shaped configuration is only illustrative and that rings of various cross-sectional designs may be fabricated using this invention.

Figure 1:
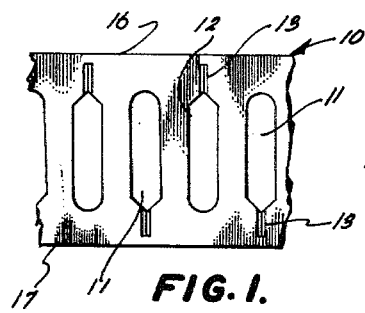
FIG. 1 is a fragmentary plan view of a blank of the type to which this invention is applied.

After the blank has been formed to the cross-sectional configuration of the ring, it is heat treated and, while hot, coiled into a helical. In the coiling of the particular ring illustrated, both edges 16 and 17 of the blank are formed into a continuous circle so that each segment of the edges defined between a pair of the score lines 13 is arcuate and forms a part of a true circle (FIGS. 1 and 2). Following coiling it is quenched to permit it to reach a brittle hardness. It is then processed to crack or break it along the score lines 13.

Figure 3:
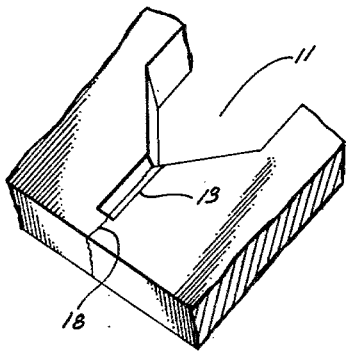
FIG. 3 is an enlarged fragmentary oblique view of a ring incorporating this invention after rupture of the material along the score lines.
Figure 4:
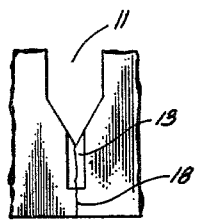
FIG. 4 is an enlarged fragmentary plan view of the ring shown in FIG. 3.

This is accomplished by subjecting the coil at each score line to tension in excess of the ultimate tensile strength of the material. This can be done by forcing the coil radially over an anvil at each score line with sufficient force to break the coil over the anvil. The score line determines the direction and position of the rupture because it forms a zone of weakness and of stress concentration. The bridge or band of material left between the end of the score line and the adjacent edge is too short to permit the line of rupture to wander sideways or circumferentially a distance great enough to have any adverse effect upon the product. This forms a part or line of separation 18 at each score line extending through the adjacent edge of the ring, dividing this outer or land portion into a plurality of individual segments (FIGS. 3 and 4). The coil is then heat treated and drawn or stretched to open slightly the separations 18 created by breaking the ring along the score lines. In a piston ring, the stretching operation provides tension in the finished ring. If this were not done the ring would lock up at the joints and have infinite tension and thus would be ineffective. The coil is then heat treated to the desired hardness and resiliency.

Figure 11:
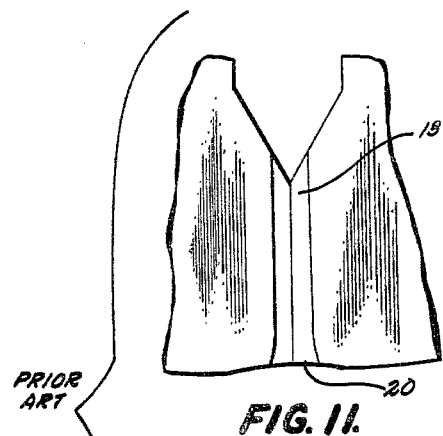
FIG. 11 is an enlarged fragmentary plan view of the condition of a blank of conventional construction after it has been coiled.
Figure 12:
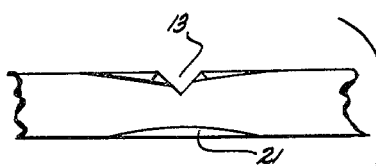
FIG. 12 is an enlarged fragmentary edge view of the blank shown in FIG. 11.

FIGS. 11 and 12 illustrate one condition which has been found to occur at times when a single, deep score line is, such as the score line 13b, extended all the way to the edge. During the coiling of the strip, the stresses incident to the stretching of the metal at the outer circumference of the coil will concentrate at the score lines since they represent points of weakness. The concentration of stresses will result in inward deformation of the metal creating an irregular edge characterized by a plurality of indentations 20. Assuming the finished product to be a piston ring, these indentations will form a plurality of gaps between the land of the ring and the cylinder wall. This will significantly increase the escape of gases and lubricants past the ring, nullifying a material part of its effectiveness.

FIG. 12 illustrates a still further effect which may result from the carrying a single, deep score line through to the edge. Not only will indentations 20 be created in the edge, but the metal will be reduced in thickness by the formation of an indentation or concavity 21 in the face of the metal opposite the score line (FIG. 12). This concavity 21 will form adjacent the edge only and, like the edge indentation 20, results from a necking down or flowing of the metal in the weakened area. This serves to further increase the actual weakness in this area.

Figure 13:
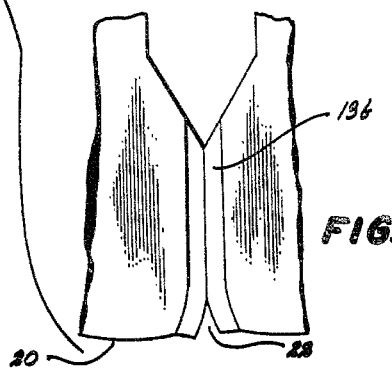
FIG. 13 is an enlarged fragmentary plan view of the blank shown in FIG. 11 illustrating the initiation of the rupturing process.

When a blank is stressed to rupture the score line 13b, the necked down, weakened area at the indentations 20 and 21 will fail substantially ahead of the metal at the rest of the score line, causing the ends to pull apart forming a V-shaped gap 22 (FIG. 13). This is true even though the metal thickness in the score line and in the necked down area is substantially the same since the necked down area is at the outer periphery and therefore, subject to the greatest circumferential tension. This will further increase the gapping which will occur between the outer edge of the ring and any circular surface against which it is butted.

This invention avoids the difficulties which have been illustrated in FIGS. 11 through 14 and described in the above paragraphs. By terminating the score lines 13, a distance back from the edge of the adjacent edge, no weak point is created along the edge which will effect a concentration of stresses. Thus, when the circumferential tension is applied to the coil to rupture the coil at each of the score lines, there will be no tendency for the stresses to concentrate in the zone between the end of the score line and the edge of the coil in such a manner as to cause a flowing or necking down of the material in this area. As a result, the rupture line 18 as illustrated in FIGS. 3 and 4 is a clean break to the edge of the coil. It leaves each of the segments of the outer edge a true segment of a continuous circle. This eliminates the gapping which may result and thus prevents excessive escape of gases and lubricants past piston rings formed by this method.

FIGS. 15 through 20 illustrate the fact that various modifications of this invention can be utilized and various combinations of these modifications will produce very desirable results. It has been found that the thickness of the material of the blank is an important factor in determining the nature of the scoring. The type of scoring and the problems discussed in connection with FIGS. 1 through 14 are directed to a relatively thick material.

FIGS. 15 through 19 illustrate the type of scoring which has been found to be particularly desirable for relatively thin materials such as, for example, a material of about 0.015 of an inch thick. In the execution of this concept, both faces of the ring blank 10b are scored. The face which is to be exterior, when the blank is bent to the final cross-sectional ring configuration, has a score 13c running to the edge of the blank. The opposite face of the blank has a score 13d (FIGS. 15, 16, 17 and 19). This score terminates a short distance back from the edge of the blank. Both scores have a depth of two to three thousandths. If this is to be practiced in thicker materials, the scores should be deepened to three to four thousandths. When such a blank is ruptured, the line of rupture is guided on both faces of the blank.

Figure 14:
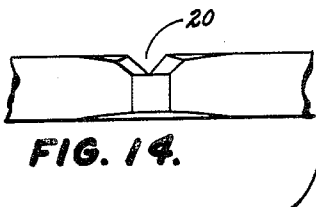
FIG. 14 is an enlarged fragmentary edge view of the blank shown in FIG. 13.

In thin material, the undersirable drawing effect illustrated in FIGS. 12 through 14 has not been experienced. In part, this may be due to the fact that less circumferential tension is required to effect rupture. Also, it may be due to the fact that the depth of the score can be reduced. Further, by providing two score lines, the depth of the score line which runs to the edge can be reduced to one-fifth to one-seventh of the material thickness. Thus, the tendency of the material to draw during the rupturing process is materially reduced.

By carrying the exterior score line 13c to the edge, the rupture is positively guided to the edge. This gives a neater appearance to the finished ring since the rupture line is positively prevented from wandering circumferentially. Terminating the inner face score line 13d short of the edge permits a sufficient body of the material to remain so that drawing or dishing is eliminated. Since the exterior score line is carried to the edge, the direction of the rupture is controlled even though the lower score line is not carried to the edge.

The use of the double score line prevents circumferential wandering of the rupture between the surfaces. Further, it produces a neater appearing ring since the surface appearance on both exterior faces of the ring is the straight line of the score rather than the irregular path traced by an unguided or partially unguided line of fracture.

It has also been found that when the blank is scored on both surfaces and both score lines are terminated short of the edge, there will be an occasional chip out at the edge. When this occurs, a small piece of the material at the very edge will break away leaving a somewhat triangular, jagged hole. Small as such chipped-out areas may be, they can materially affect the sealing qualities of the ring, particularly if there are very many of them.

Figure 15:
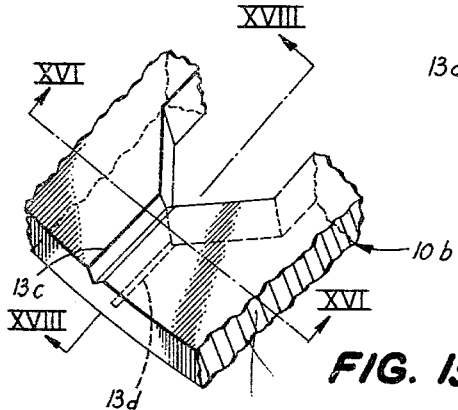
FIG. 15 is an enlarged fragmentary oblique view of a ring incorporating a modified form of this invention prior to rupture of the material along the score line.
Figure 16:
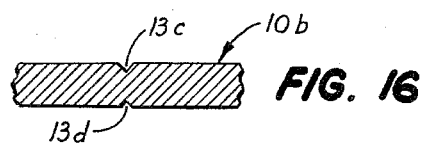
FIG. 16 is an enlarged fragmentary sectional view taken along the plane XVI—XVI of FIG. 15.
Figure 17:
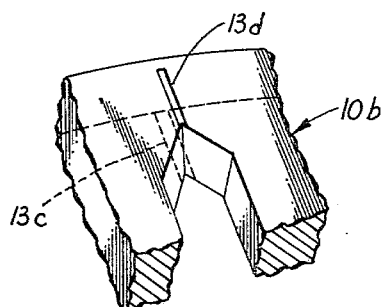
FIG. 17 is an enlarged fragmentary bottom view of the structure illustrated in FIG. 15.
Figure 18:
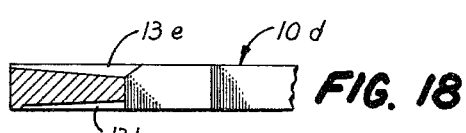
FIG. 18 is a sectional elevation view taken along the plane XVIII—XVIII of FIG. 15 showing score lines of tapered depth.

FIG. 18 illustrates the application of score lines 13e and 13h of tapered depth to a blank 10d which otherwise incorporates the form of the invention illustrated in FIGS. 15 through 17. The use of this type of scoring does not change the results as discussed in the immediately preceding paragraphs.

Figure 19:
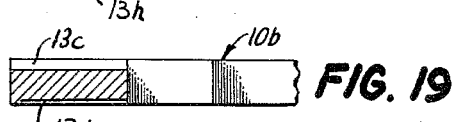
FIG. 19 is an enlarged sectional elevation view taken along the same plane as FIG. 18 but showing a modified form of the invention showing score lines of uniform depth.

FIG. 19 illustrates the application of score lines 13c and 13d where the score lines are of equal depth throughout their length.

Figure 20:
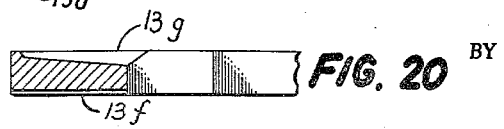
FIG. 20 is an enlarged sectional elevation view taken along the same plane as FIG. 18 but showing a further modified form of the invention.

FIG. 20 illustrates the fact that under certain circumstances, with particular gauges of materials of particular types, it may be desirable to carry the interior score line 13f to the edge while terminating the exterior score line 13g short of the edge.

Figure 22:
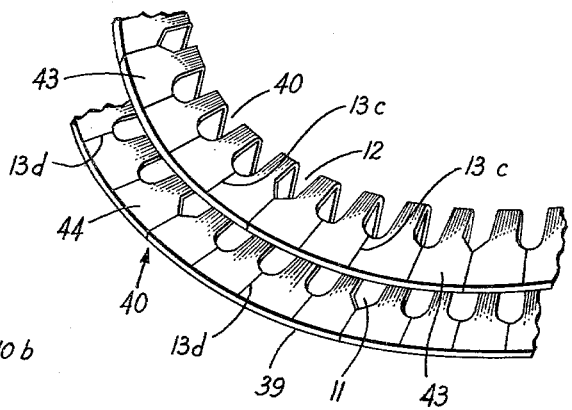
FIG. 22 is a fragmentary oblique view of a ring made from the blank illustrated in FIG. 21 and in which only selected ones of the score lines are ruptured.
Figure 21:
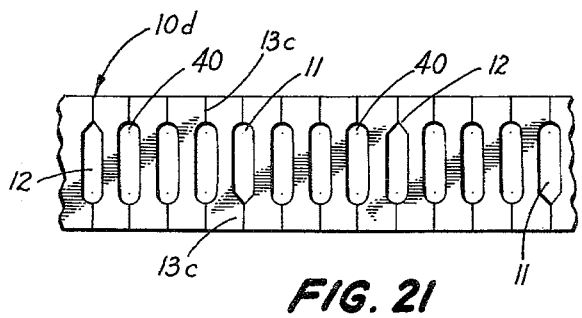
FIG. 21 is a fragmentary plan view of a modified blank incorporating this invention.

FIGS. 21 and 22 illustrate the fact that where a ring 40 is desired, having relatively long segments 43 and 44, only selected ones of the score lines need be ruptured. In this ring, the usual score lines 13c and 13d are provided at the end of each of the slots. However, only those slots 11 and 12 at which the blank 10d is to be ruptured have a wedge-shaped end, both ends of the other slots 41 being rounded. It will be recognized that all slots may have wedge-shaped ends. The arrangement is particularly desirable in coiling such a ring. The presence of the score lines at every slot provides a ring of uniform characteristics throughout its circumference. If the core lines were provided only at the ends of the slots where rupturing is to be performed, the unscored portions of the edge at the ends of the slots 40 would be stronger than those portions which had been scored. This lack of uniformity of material characteristics has been found to result in non-uniform coiling and thus a ring of slightly irregular circumferential configuration. The application of the score lines irrespective of whether or not the blank is to be ruptured at that point establishes uniformity and thus eliminates this problem of irregularity. This is an important advance in this type of ring because it frees the length of the segment from the frequency of the score lines. Thus, a number of different rings can be made from a single die.

Figure 23:
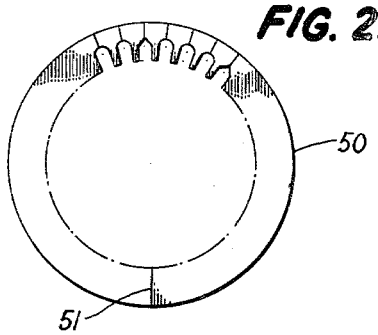
FIG. 23 is a somewhat schematic plan view of a completed ring incorporating this invention showing the gap closed.

FIG. 23, while showing the embodiment of this invention more particularly illustrated in FIG. 22, illustrates the fact that all embodiments of this invention produce a ring 50 having a part 51 which, when the ring is in free state, is open, creating a gap. When the ring 50 is compressed such as when it is installed in a cylinder, the part 51 is closed and the ring is then circular as illustrated in FIG. 23.

While the invention has been described together with modifications, it will be recognized that other modifications may be made, each practicing the basic principle of this invention. The invention, together with such modifications as practice the principle of the invention, are to be considered as included in the hereinafter appended claims.

I claim:

1. A piston ring having a body characterized by a plurality of equally spaced apertures spaced from both edges of said ring body and at least one flange integral with said body, said flange having a plurality of segments each separated from each adjacent segment by a severance line extending radially from one of said apertures to the adjacent edge of said flange, said edge being arcuate and provided for scraping contact with a cylinder wall, said flange initially having indentations in at least one side of said flange and extending along said lines but terminating short of said edge, said flange being fractured along said severance lines through the flanges' entire remaining thickness and entirely to said edge.

2. A piston ring having a body characterized by a plurality of equally spaced apertures spaced from both edges of said ring body and at least one flange integral with said body, said flange having a plurality of segments each separated from each adjacent segment by a severance line extending radially from one of said apertures to the adjacent edge of said flange, said edge being arcuate and provided for scraping contact with a cylinder wall, said flange initially having a plurality of indentations in at least one side of said flange and extending along said lines but terminating short of said edge, said flange being fractured along said severance lines through the flanges' entire remaining thickness and entirely to said edge, said severance lines being formed at only selected ones of said indentations.

3. A piston ring having a body characterized by a plurality of equally spaced apertures spaced from both edges of said ring body and at least one flange integral with said body, said flange having a plurality of segments each separated from each adjacent segment by a severance line extending radially from one of the apertures to the adjacent edge of said flange, said edge being arcuate and provided for scraping contact with a cylinder wall, said flange initially having indentations in both faces of said flange and extending along said lines, at least one of said indentations terminating short of said edge, said flange being fractured along said severance lines through the flanges' entire remaining thickness and entirely to said edge.

4. A piston ring including flanges having a plurality of connected sections separated by cutout portions but being extendible from each other by reason of a plurality of severance lines extending from said cutout portions to the edges of said flanges, said edges being arcuate and provided for scraping contact with a cylinder wall, the improvement comprising indentations in at least one side of said flange and extending along said lines but terminating short of said edge, said flange being fractured along said severance lines through the flanges' entire remaining thickness and entirely to said edge.

5. A piston ring including a flange having a pair of side faces and an arcuate edge provided for scraping contact with a cylinder wall; a plurality of cutout portions terminating short of said edge; an indentation in at least one side face of said flange and extending along a radial line between each of said cutout portions and said edge; at equally spaced intervals said flange being fractured along selected ones of said indentations through its entire remaining thickness from said cutout portion entirely to said edge to form individual segments of said flange.

6. A piston ring including a flange having a pair of side faces and an arcuate edge provided for scraping contact with a cylinder wall; a plurality of cutout portions terminating short of said edge; a pair of indentations one in each of said side faces of said flange, each pair of indentations extending along a radial line between each of said cutout portions and said edge; at equally spaced intervals said flange being fractured along selected ones of said pairs of indentations through its entire remaining thickness from said cutout portion entirely to said edge to form individual segments of said flange.

7. A piston ring characterized by at least one land portion having an edge adapted to make scraping contact with a cylinder wall, said land portion being divided into a plurality of individual segments defined and separated from each other by partings, the improvement in said piston ring comprising: said partings for a portion of their length being formed in part by an indentation in said metal extending radially of said ring and in part by fracturing of the metal from the bottom of the indentation through the remainder of the metal's thickness and said partings from said edge to a point inwardly therefrom being formed by fracture of the metal through the entire thickness of said metal.

8. A piston ring characterized by at least one land portion having an edge adapted to make scraping contact with a cylinder wall, said land portion having a pair of side faces and being divided into a plurality of individual segments defined and separated from each other by partings, the improvement in said piston ring comprising: said partings for a portion of their length being formed in part by a pair of aligned indentations in said metal one in each side face of said land portion and extending radially of said ring and in part by fracturing of the metal from the bottoms of the indentations through the remainder of the metal's thickness and said partings from said edge to a point inwardly therefrom being formed by fracture of the metal through the entire thickness of said metal.

9. A piston ring characterized by at least one land portion having an edge adapted to make scraping contact with a cylinder wall, said land portion having a pair of side faces and being divided into a plurality of individual segments defined and separated from each other by partings, the improvement in said piston ring comprising: said partings for a portion of their length in one of said faces being formed in part by an indentation in said metal terminating short of said edge and in the other of said faces by an indentation in said metal extending entirely to said edge and in part by fracturing of the metal between the bottoms of the indentations through the remainder of the metal's thickness and from the end of said indentation in said other faces to said edge.

References Cited by the Examiner

UNITED STATES PATENTS

| 2,224,338 | 12/40 | Bowers | 277—200 |
| 2,273,691 | 2/42 | Bowers | 277—200 |

EDWARD V. BENHAM, *Primary Examiner.*